(12) United States Patent
Kitakami et al.

(10) Patent No.: US 9,781,498 B2
(45) Date of Patent: Oct. 3, 2017

(54) MICROPHONE STAND AND MICROPHONE STAND SET

(71) Applicant: D&M Holdings, Inc., Kanagawa (JP)

(72) Inventors: Yasuharu Kitakami, Fukushima (JP); Martin Richard Wachter, Phoenix, MD (US)

(73) Assignee: D&M Holdings, Inc., Kanagawa (JP)

( * ) Notice: Subject to any disclaimer, the term of this patent is extended or adjusted under 35 U.S.C. 154(b) by 5 days.

(21) Appl. No.: 15/038,071

(22) PCT Filed: Apr. 15, 2014

(86) PCT No.: PCT/JP2014/060672
§ 371 (c)(1),
(2) Date: May 20, 2016

(87) PCT Pub. No.: WO2015/075955
PCT Pub. Date: May 28, 2015

(65) Prior Publication Data
US 2016/0360306 A1    Dec. 8, 2016

(30) Foreign Application Priority Data
Nov. 20, 2013 (JP) .................................. 2013-240478

(51) Int. Cl.
*H04R 1/08* (2006.01)
*F16M 11/22* (2006.01)
(Continued)

(52) U.S. Cl.
CPC ............... *H04R 1/08* (2013.01); *F16M 11/22* (2013.01); *F16M 11/24* (2013.01); *F16M 11/28* (2013.01); *F16M 2200/028* (2013.01)

(58) Field of Classification Search
CPC .. F16M 11/22; F16M 11/24; F16M 2200/028; H04R 1/026; H04R 1/00; H04R 1/02
See application file for complete search history.

(56) References Cited

U.S. PATENT DOCUMENTS 3,415,475 A * 12/1968 Goodman .............. F16M 11/22
                                                  248/158
4,021,012 A *  5/1977 Miller .................... B66F 19/00
                                                  248/161
(Continued)

FOREIGN PATENT DOCUMENTS

JP          06-13292 U    7/1992
JP      2009-278434 A   11/2009
JP          3182513 U    4/2013

OTHER PUBLICATIONS

Microfilm of the Specification and Drawings annexed to the request of Japanese Utility Model Application No. 109712/1980 (Laid-open No. 32868/1982) (Hitachi Construction Machinery Co. Ltd., Feb. 20, 1982 fig. 3).
(Continued)

*Primary Examiner* — Duc Nguyen
*Assistant Examiner* — Taunya McCarty
(74) *Attorney, Agent, or Firm* — Peter A. Nieves; Sheehan Phinney Bass & Green PA

(57) ABSTRACT

[Problem] To provide, at a lower cost, a microphone stand the height of which can be adjusted by an easy operation. [Solution] A support strut (5) of an acoustic characteristic measurement microphone comprises two rectangular-tube-shaped attachment parts (1, 2) that are attached to each other in the axis direction by inserting one of the attachment parts into the other such that the one can slide within the other in the axis direction. A plurality of height adjustment slits (19) that are aligned in the height direction of the microphone stand are formed in a corner portion of the one attachment part (1). In the other attachment part (2), an attachment slit (22) is formed at a position where the plurality of height adjustment slits (19) pass due to the sliding of the two attachment parts (1, 2) in the height direction of the microphone stand. A cord (71) of the acoustic characteristic
(Continued)

measurement microphone (7) placed on the top of the microphone stand is pushed into and fixed to the interior of two slits (19, 22) that have been positioned by the sliding of the two attachment parts.

10 Claims, 5 Drawing Sheets

(51) Int. Cl.
  *F16M 11/24* (2006.01)
  *F16M 11/28* (2006.01)

(56) References Cited

U.S. PATENT DOCUMENTS

| | | | | |
|---|---|---|---|---|
| 4,141,526 A | * | 2/1979 | John | B66F 3/08 248/352 |
| 4,245,808 A | * | 1/1981 | John | B66F 3/08 248/165 |
| 5,490,599 A | * | 2/1996 | Tohidi | H04R 1/406 211/171 |
| 6,487,298 B1 | * | 11/2002 | Hacker | H04R 1/08 181/199 |

OTHER PUBLICATIONS

Microfilm of the Specification and Drawings annexed to the request of Japanese Utility Model Application No. 14632/1980 (Laid-open No. 69366/1962 (Primo Co. Ltd., Apr. 26, 1982 fig. 1).

Microfilm of the Specification and Drawings annexed to the request of Japanese Utility Model Application No. 029464/1973 (Laid-open No. 131931/1974 Elmo Co. Ltd., Nov. 13, 1974 fig. 2, 3).

International Search Report for PCT/JP2014/060672, dated Jun. 10, 2014.

"Yamaha YSP-2200 (YSP-CU2200+NS-SWP600) Quick Reference Guide", [online], Yamaha Corporation, [Retrieved on Nov. 4, 2013], Internet <URL: http://www2.yamaha.co.jp/manual/pdf/av/japan/ht/YSP-2200_qrg_J.pdf>.

* cited by examiner

MICROPHONE STAND AND MICROPHONE STAND SET

CROSS-REFERENCE TO RELATED APPLICATIONS

This application is the National Stage of International Application No. PCT/JP2014/060672, filed Apr. 15, 2014, which claims the benefit of Japanese Patent Application No. 2013-240478, filed Nov. 20, 2013. The contents of these prior applications are incorporated by reference herein in their entirety.

TECHNICAL FIELD

The present invention relates to the structure of a microphone stand suitable to mount a microphone for acoustic characteristic measurement, which is located at a listening position in a setup of a multichannel audio system and other systems.

BACKGROUND ART

In a setup of a multichannel audio system including a plurality of speakers, a listening environment at a listening position may be optimized by arranging a microphone for acoustic characteristic measurement at the listening position and collecting test signals output from the respective speakers with the microphone for acoustic characteristic measurement. An example of such an acoustic device configured to automatically perform optimization includes a sound field characteristic-adjusting device disclosed in Patent Literature 1. The sound field characteristic-adjusting device is configured to sequentially output impulse signals from a plurality of speakers, to measure periods of time required for the impulse signals from the respective speakers to reach a microphone for acoustic characteristic measurement (sound arrival times), and to set delay times corresponding to the sound arrival times in a delay section for the respective speakers (sound localization setting). After such sound localization setting is performed, pink noise having flat frequency characteristics is output from the respective speakers after delays by the delay times set at the respective speakers. Signals thus detected with the microphone for acoustic characteristic measurement are subjected to frequency analysis, and correction coefficients of the respective frequency bands are set in a parametric equalizer (setting of sound field frequency). The respective channel audio signals are thus corrected for frequency so that the frequency characteristics become flat, and are then output from the respective speakers with delays by corresponding delay times.

Incidentally, in a setup of a multichannel audio system, a microphone stand configured to place a microphone for acoustic characteristic measurement thereon is necessary to locate the microphone for acoustic characteristic measurement in the vicinity of a height of ears of a user who listens to music and the like at a listening position. Such a microphone stand is only used to optimize the listening environment at the listening position. Therefore, it is often recommended to use a camera stand owned by a user or a stand having a suitable height instead of the microphone stand. However, not all users have a camera stand or a stand having a suitable height. Then, some acoustic instruments constructing a multichannel audio system are supplied with a plurality of pieces of cardboard capable of easily assembling a microphone stand only by insertion into cutouts, as described in, for example, Non Patent Literature 1.

CITATION LIST

Patent Literature

[PTL 1] JP 06-13292 U

Non Patent Literature

[NPL 1] "YAMAHA YSP-2200 (YSP-CU2200+NS-SWP600) Quick Reference Guide", [online], YAMAHA CORPORATION, [Retrieved on Nov. 4, 2013], Internet <URL: http://www2.yamaha.co.jp/manual/pdf/av/japan/ht/YSP-2200_qrg_J.pdf>

SUMMARY OF INVENTION

Technical Problem

However, in the microphone stand described in Non Patent Literature 1 that is assembled by inserting a piece of cardboard into cutouts of another piece of cardboard, the height of the microphone stand is fixed. Therefore, in a case of, for example, a tall user, the user needs to adjust a position of the microphone for acoustic characteristic measurement by placing the microphone stand on a stand, a magazine, or the like so that the microphone for acoustic characteristic measurement is located in the vicinity of a height of ears of the user.

The present invention has been made in view of the above-mentioned circumstances, and an object of the present invention is to provide a microphone stand capable of height adjustment with a simple operation at lower cost.

Solution to Problem

In order to achieve the above-mentioned object, according to one aspect of the present invention, there is provided a microphone stand configured to hold a microphone, the microphone stand including a first tubular part and a second tubular part, which are connected together in a height direction of the microphone stand by slidable insertion of one of the first tubular part and the second tubular part into another one of the first tubular part and the second tubular part in an axis center direction of the microphone stand, the first tubular part having a plurality of first cutouts, in each of which a middle portion of each of the plurality of first cutouts projects outward from a straight line connecting both ends of the each of the plurality of first cutouts, the plurality of first cutouts being formed in line in the height direction of the microphone stand, the second tubular part having a second cutout formed at a position through which the plurality of first cutouts pass by relative sliding of the first tubular part and the second tubular part in the height direction of the microphone stand, the second cutout being positionally aligned with any one of the plurality of first cutouts, a cord of the microphone being arranged inside the any one of the plurality of first cutouts and the second cutout, which are positionally aligned with each other by the relative sliding of the first tubular part and the second tubular part in the height direction of the microphone stand, to thereby serve as a stopper configured to prevent the relative sliding of the first tubular part and the second tubular part in the height direction of the microphone stand.

According to another aspect of the present invention, there is provided a microphone stand configured to hold a microphone, the microphone stand including a first tubular part and a second tubular part, which are connected together in a height direction of the microphone stand by slidable insertion of one of the first tubular part and the second tubular part into another one of the first tubular part and the second tubular part in an axis center direction of the microphone stand, the first tubular part having a plurality of first cutouts formed in line in the height direction of the microphone stand, the second tubular part having a second cutout formed at a position through which the plurality of first cutouts pass by relative sliding of the first tubular part and the second tubular part in the height direction of the microphone stand, the second cutout being positionally aligned with any one of the plurality of first cutouts, an edge portion of one of the anyone of the plurality of first cutouts and the second cutout, which are positionally aligned with each other by the relative sliding of the first tubular part and the second tubular part in the height direction of the microphone stand, being pushed into another one of the any one of the plurality of first cutouts and the second cutout, to thereby prevent the relative sliding of the first tubular part and the second tubular part in the height direction of the microphone stand.

Advantageous Effects of Invention

The microphone stand according to the present invention includes the first tubular part and the second tubular part, which are connected together in the height direction of the microphone stand by the slidable insertion of one into the other. Therefore, the height of the microphone stand can be easily adjusted by a sliding operation of those two tubular parts. The first tubular part has the plurality of first cutouts, in each of which the middle portion projects outward from the straight line connecting both the ends, and which are formed at intervals in the height direction of the microphone stand. The second tubular part has the cutout formed so as to be positionally aligned with any one of the plurality of cutouts in the first tubular part. Therefore, without separately preparing a special stopper, the height of the microphone stand can be fixed by arranging the cord of the microphone inside the two cutouts positionally aligned with each other by the sliding operation of the two tubular parts, or by pushing the edge portion of one cutout into the other cutout. Therefore, the microphone stand capable of height adjustment with a simple operation can be provided at lower cost.

DESCRIPTION OF EMBODIMENTS

An embodiment of the present invention is described below with reference to the drawings.

The overall structure of a microphone stand 100 according to this embodiment is first described. A case of using a microphone 7 for acoustic characteristic measurement, which has a quadrangular pyramid-shaped casing, as a microphone for acoustic characteristic measurement, which is located at a listening position in a setup of a multichannel audio system including a plurality of speakers, is taken as an example.

Figure 1:
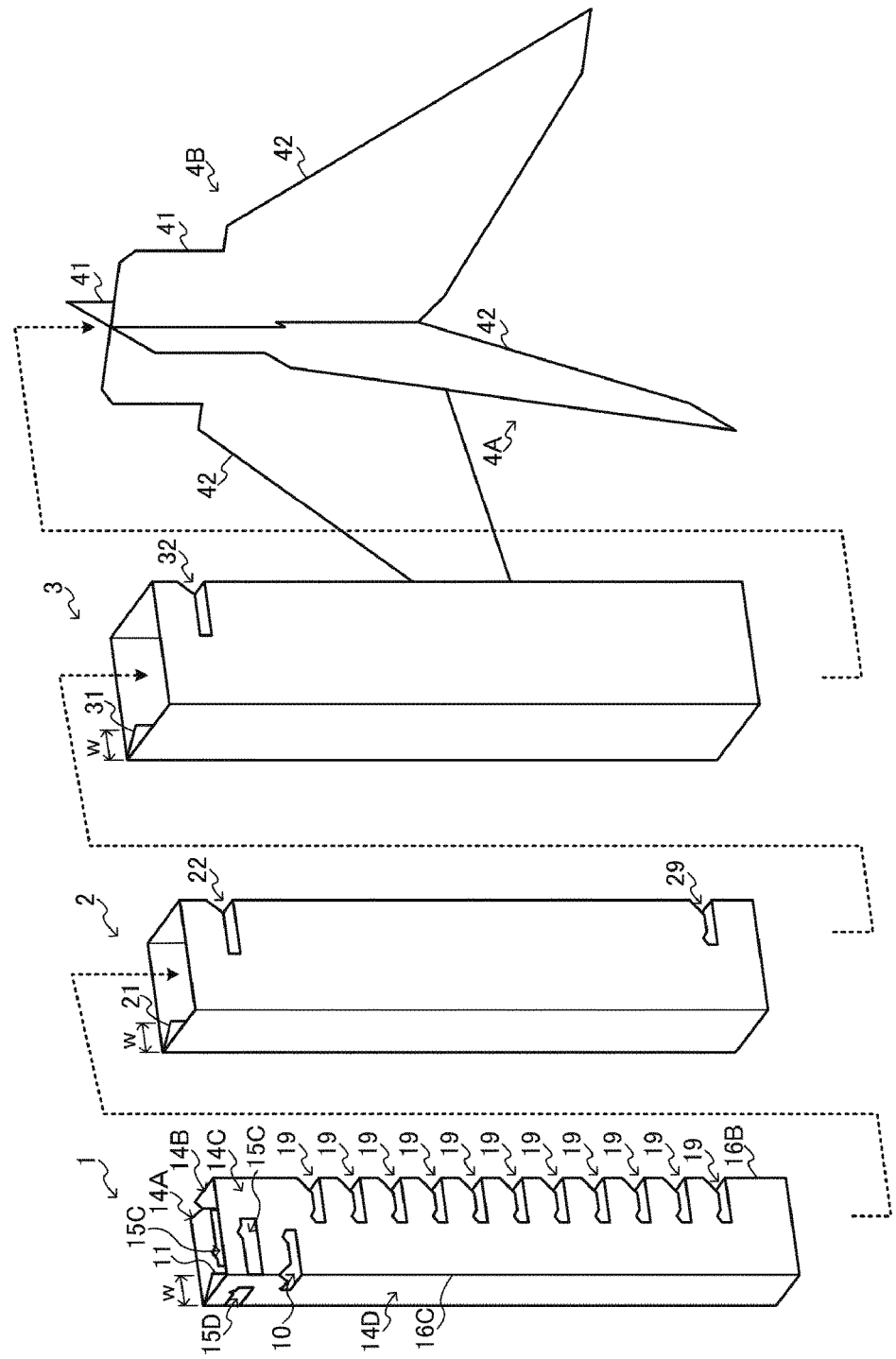
FIG. 1 is a view for illustrating appearances of parts 1 to 3, 4A, and 4B included in a microphone stand set according to an embodiment of the present invention and an order of assembly thereof.
Figure 2:
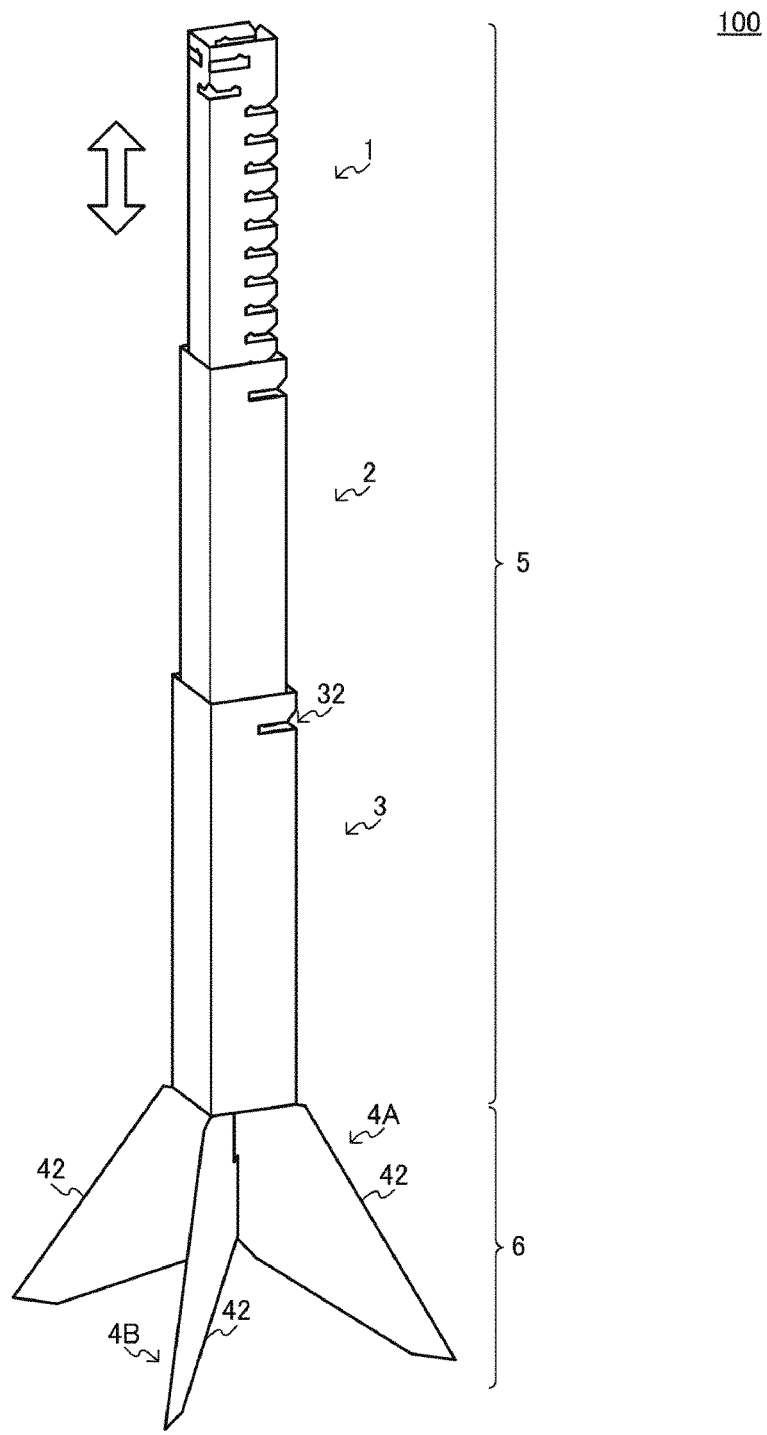
FIG. 2 is an external view of a microphone stand 100 assembled from the microphone stand set.

FIG. 1 is a view for illustrating appearances of parts 1 to 3, 4A, and 4B included in a microphone stand set according to this embodiment and an assembly procedure thereof. FIG. 2 is an external view of the microphone stand 100 assembled from the microphone stand set. FIG. 3(A) to FIG. 3(D) are views for illustrating a procedure for mounting the microphone 7 for acoustic characteristic measurement to the microphone stand 100. FIG. 4(A) to FIG. 4(C) are partial enlarged views of the microphone stand 100 to which the microphone 7 for acoustic characteristic measurement is mounted.

As illustrated in FIG. 1 and FIG. 2, the microphone stand 100 in a completed state includes a pillar portion 5 configured to hold the microphone 7 for acoustic characteristic measurement at an upper end portion of the pillar portion 5, and a base portion 6 configured to hold the pillar portion 5 in an upright posture. The microphone stand set includes the plurality of connection parts 1 to 3 (three in this embodiment) configured to form the pillar portion 5, and the two plate-like base parts 4A and 4B constructing the base portion 6. Those parts 1 to 3, 4A, and 4B are each formed of a sheet of paper board (cardboard) having a suitable strength.

The three connection parts 1 to 3 each have a quadrangular tube shape capable of nesting from two opposite directions along their axis centers. Each of those connection parts 1 to 3 is formed by folding a piece of paper board (cardboard) punched out in a predetermined pattern so that two pairs of opposed lateral surfaces are positioned substantially in parallel, and by bonding at an adhesion margin 11, 21, or 31 having a suitable width W. Each of those connection parts 1 to 3 can be folded down by collapsing so that among two pairs of opposed ridge lines (mountain fold lines each positioned at a boundary between adjacent lateral surfaces), one pair of ridge lines are only folded (so that among two pairs of opposed corner portions, one pair of corner portions have smaller angles, whereas the other pair of corner portions have angles close to 180°).

The three connection parts 1 to 3 are sequentially inserted in their axis center direction in an order of opening size into one end portion (among two end portions, one end portion positioned on an upper side of the microphone stand 100 in the upright posture: this end portion is hereinafter referred to as "upper end portion") of a connection part having a larger opening size to be connected together in a height direction of the microphone stand 100. In the thus formed pillar portion 5, slits (cutouts: slits 19 for height adjustment and slits 22, 29, and 32 for connection) described later, which are formed at the corner portions of the connection parts 1 to 3, and a cord 72 of the microphone 7 for acoustic characteristic measurement, which is fitted into those slits 19, 22, 29, and 32, construct a lock mechanism configured to mutually lock the connection parts 1 to 3 connected to each other. In the pillar portion 5 in the upright posture, the connection part 1 positioned in an uppermost stage is hereinafter called "uppermost stage connection part 1", the connection part 3 positioned in a lowermost stage is hereinafter called "lowermost stage connection part 3", and the connection part 2 positioned between the uppermost stage connection part 1 and the lowermost stage connection part 3 is hereinafter called "intermediate connection part 2".

As illustrated in FIG. 3(A) to FIG. 3(D), at the upper end portion of the uppermost stage connection part 1, microphone-holding slits (cutouts) 15A to 15D, which extend along a width direction of four lateral surfaces 14A to 14D, are formed one by one in the respective lateral surfaces 14A to 14D, respectively. Those microphone-holding slits 15A to 15D are positioned at substantially the same height in the microphone stand 100 in the upright posture, and extend from positions on ridge lines 16A to 16D different from each other to positions beyond center lines 17A to 17D of the respective lateral surfaces 14A to 14D, which extend in the axis center direction. Corner portions 74A to 74D of a casing base 71 of the microphone 7 for acoustic characteristic measurement, which is inserted into the upper end portion of the uppermost stage connection part 1, are inserted into those microphone-holding slits 15A to 15D, respectively. Then, in order to prevent the microphone 7 for acoustic characteristic measurement from shaking, notches 12A to 12D with which the casing of the microphone 7 for acoustic characteristic measurement is to be engaged are respectively formed in cut edges (edge portions) surrounding the respective microphone-holding slits 15A to 15D at positions corresponding to a shape of the casing of the microphone 7 for acoustic characteristic measurement. For example, according to this embodiment, the casing of the microphone 7 for acoustic characteristic measurement has a quadrangular pyramid shape, and hence the triangular notches 12A to 12D directed upward are formed in the cut edges surrounding the respective microphone-holding slits 15A to 15D at positions on the center lines 17A to 17D of the corresponding lateral surfaces 14A to 14D, which extend in the axis center direction, so that respective ridge lines 73 of the casing of the microphone 7 for acoustic characteristic measurement are engaged with those notches 12A to 12D.

In the uppermost stage connection part 1, a slit (cutout) 18 for cord insertion, which connects an upper end surface of the uppermost stage connection part 1 (edge portion surrounding an opening on the upper end portion side) to any one of the microphone-holding slits 15A to 15D (in this case, the microphone-holding slit 15A), is formed along the ridge line 16A at which one end portion of the microphone-holding slit 15A is positioned. When the microphone 7 for acoustic characteristic measurement is to be inserted into the upper end portion of the uppermost stage connection part 1, the cord 72 pulled out from the predetermined base corner portion 74A of the microphone 7 for acoustic characteristic measurement is inserted from the upper end surface side of the uppermost stage connection part 1 into the microphone-holding slit 15A through the slit 18 for cord insertion. In order to enable smooth introduction of the cord 72 into the slit 18 for cord insertion from the upper end surface side of the uppermost stage connection part 1 in this step, the corner portions of the two lateral surfaces 14A and 14B on both sides of the slit 18 for cord insertion are obliquely cut out from the upper end surface of the uppermost stage connection part 1 with respect to the ridge line 16A to increase a slit width of the slit 18 for cord insertion on the upper end surface side of the uppermost stage connection part 1.

Among the corner portions corresponding to the respective ridge lines 16A to 16D of the uppermost stage connection part 1, the corner portion other than the corner portion where the slit 18 for cord insertion is positioned (according to this embodiment, the corner portion opposed to the corner portion where the slit 18 for cord insertion is positioned) has a slit (cutout) 10 for microphone fixation, which is formed at a position below the microphone-holding slits 15A to 15D in the microphone stand 100 in the upright posture. The slit 10 for microphone fixation intersects with the ridge line 16C of the uppermost stage connection part 1, and extends substantially in a horizontal direction in the lateral surfaces 14C and 14D on both sides of the ridge line 16C. The cord 72 pulled out from the base corner portion 74A of the microphone 7 for acoustic characteristic measurement, which is received inside the microphone-holding slit 15A, is inserted into the slit 10 for microphone fixation from the corner portion corresponding to the ridge line 16C of the uppermost stage connection part 1, and is pushed to both end portions of the slit 10 for microphone fixation toward the axis center of the connection part 1 (see FIG. 3(D)). The slit 10 for microphone fixation has a slightly smaller slit width than a diameter of the cord 72 of the microphone 7 for acoustic characteristic measurement, and notches 13 directed upward are formed in a cut edge of the slit 10 for microphone fixation at positions of both the end portions of the slit 10 for microphone fixation. Therefore, the cord 72 pushed to both the end portions of the slit 10 for microphone fixation is securely caught in the notches 13. The cord 72 is thus grasped in those notches 13, and hence is prevented from moving away from the slit 10 for microphone fixation. Further, above and below the slit 10 for microphone fixation, the corner portion corresponding to the ridge line 16C of the uppermost stage connection part 1 is obliquely cut out with respect to the slit 10 for microphone fixation to increase the slit width of the slit 10 for microphone fixation on the ridge line 16C side of the uppermost stage connection part 1. Therefore, the cord 72 can be smoothly guided into the slit 10 for microphone fixation from the corner portion corresponding to the ridge line 16C of the uppermost stage connection part 1.

Further, among the corner portions corresponding to the respective ridge lines 16A to 16D of the uppermost stage connection part 1, at least one corner portion (according to this embodiment, the corner portion corresponding to the ridge line 16B) has a plurality of slits 19 for height adjustment, which are formed in line at predetermined intervals in the axis center direction. In a state in which the slit 22 for connection (described later) of the intermediate connection part 2 is positionally aligned with any one of the slits 19 for height adjustment by a sliding operation of the uppermost stage connection part 1 and the intermediate connection part 2, the cord 72 having passed through the slit 10 for microphone fixation is inserted into the slit 19 for height adjustment, which is exposed from the slit 22 for connection of the intermediate connection part 2, and is pushed to both end portions of the slit 19 for height adjustment (see FIG. 4(C)). Notches directed upward are formed in a cut edge of the slit 19 for height adjustment at positions of both the end portions of the slit 19 for height adjustment. Then, the cord 72 pushed to both the end portions of the slit 19 for height adjustment is pressed by a cut edge of the slit 22 for connection (described later) of the intermediate connection part 2 to be securely caught in those notches. The cord 72 is thus grasped in those notches, and hence is prevented from moving away from the slit 19 for height adjustment.

On an upper side of each slit 19 for height adjustment, the corner portion corresponding to the ridge line 16B of the uppermost stage connection part 1 is obliquely cut out with respect to each slit 19 for height adjustment to increase a slit width of each slit 19 for height adjustment on the ridge line 16B side of the uppermost stage connection part 1. Therefore, in any slit 19 for height adjustment, the cord 72 can be smoothly guided into the slit 19 for height adjustment from the corner portion corresponding to the ridge line 16B of the uppermost stage connection part 1.

The upper end portion of the intermediate connection part 2 has the slit 22 for connection, which is formed at any one corner portion among the corner portions corresponding to the respective ridge lines. The slit 22 for connection is formed at a position through which the plurality of slits 19 for height adjustment of the uppermost stage connection part 1 pass in the axis center direction by the sliding operation of the uppermost stage connection part 1 inserted into the upper end portion of the intermediate connection part 2, and is positionally aligned with any one slit 19 for height adjustment depending on a desired height of the microphone stand 100. The slit 22 for connection has such a shape that the entire slit 19 for height adjustment, which is positionally aligned with the slit 22 for connection, is exposed.

Further, a lower end portion of the intermediate connection part 2 has the slit 29 for connection, which has the same shape as the slits 19 for height adjustment of the uppermost stage connection part 1, and is formed at any one corner portion (for example, the corner portion at which the slit 22 for connection is formed) among the corner portions corresponding to the respective ridge lines. The slit 29 for connection is formed at a height position at which the slit 29 for connection does not interfere with a lower end portion (an end portion on an opposite side to the upper end portion) of the uppermost stage connection part 1 when the slit 22 for connection is positionally aligned with the slit 19 for height adjustment, which is at the position closest to the upper end portion of the uppermost stage connection part 1.

The upper end portion of the lowermost stage connection part 3 has the slit 32 for connection, which is formed at any one corner portion among the corner portions corresponding to the respective ridge lines. The slit 32 for connection is positionally aligned with the slit 29 for connection of the intermediate connection part 2 by a sliding operation of the lowermost stage connection part 3 and the intermediate connection part 2 inserted into the lowermost stage connection part 3. The slit 32 for connection has such a shape that the entire slit 29 for connection, which is positionally aligned with the slit 32 for connection, is exposed.

The two base parts 4A and 4B each have such a two-pronged shape that two leg portions 42 are branched from a lower end of a quadrangular insertion portion 41. Each of the base parts 4A and 4B having such a two-pronged shape may be formed by punching out paper board into a pattern having an outer shape of the base part, or may be formed by punching out paper board into a pattern including a flap added to the outer shape of the base part and folding back the flap along the outer shape line of the base part.

The base part 4A on one side has a slit formed along a center line from an upper end of the insertion portion 41 so as to have a width determined by a thickness of the base part 4B on the other side, and the base part 4B on the other side has a slit formed along the center line from a position between the two leg portions 42 so as to have a width determined by a thickness of the base part 4A on one side. Those two base parts 4A and 4B are respectively inserted into the slits of the other mating base parts to intersect with each other so that the four leg portions 42 (one leg portion is not shown) are positioned radially. The thus formed base portion 6 can be folded down by rotating the base part 4A on one side about the center line of the base part 4B on the other side.

Next, an assembly procedure of the microphone stand 100 is described. An operation order described herein is an example, and may be suitably modified.

Figure 3A:
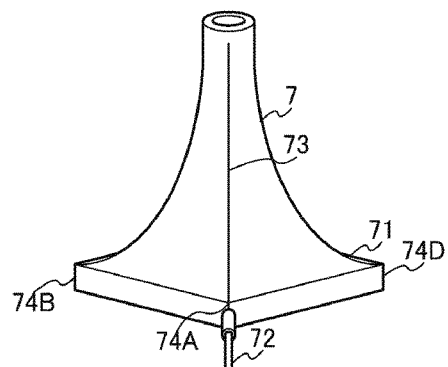
FIG. 3(A) to FIG. 3(D) are views for illustrating a procedure for mounting a microphone 7 for acoustic characteristic measurement to the microphone stand 100.
Figure 4A:
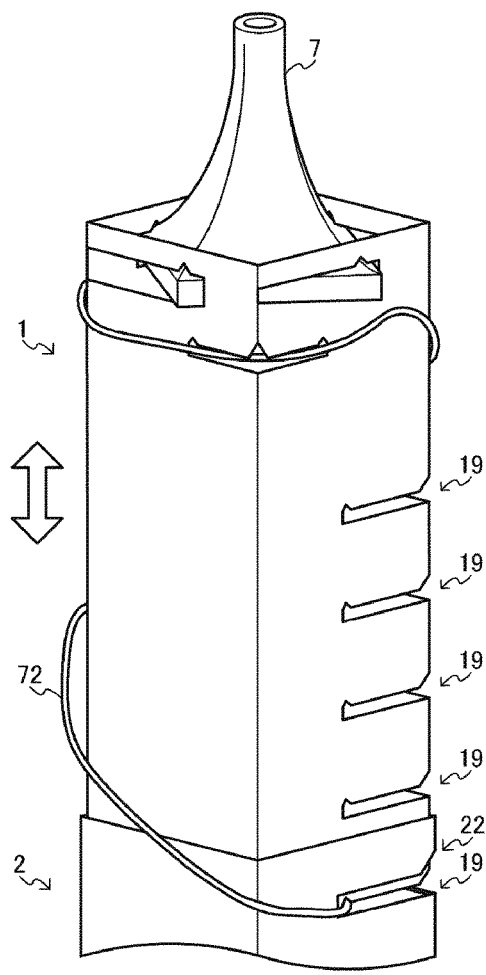
FIG. 4(A) to FIG. 4(C) are partial enlarged views of the microphone stand 100 to which the microphone 7 for acoustic characteristic measurement is mounted.
Figure 4B:
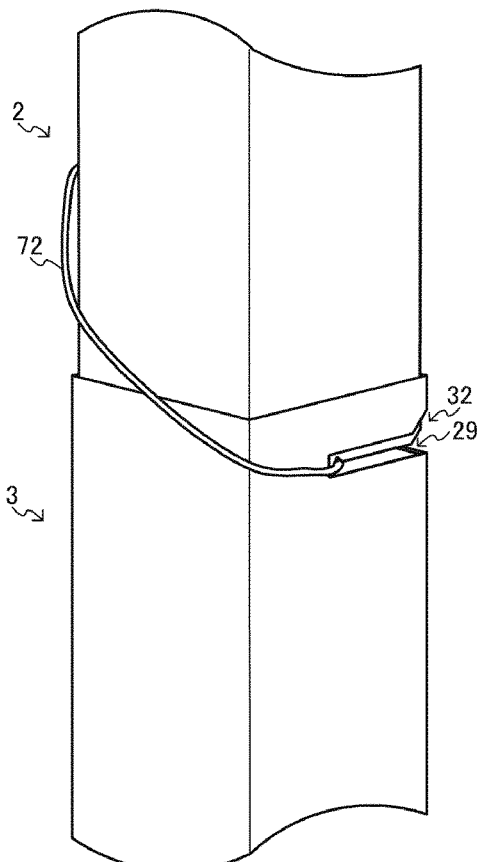
Figure 4C:
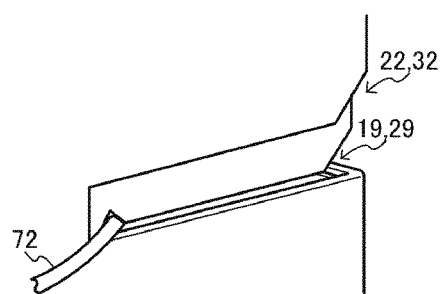

As illustrated in FIG. 3(A), the base 71 of the microphone 7 for acoustic characteristic measurement is inserted into the upper end portion of the uppermost stage connection part 1 up to a position of the microphone-holding slits 15A to 15D while, among the four corner portions 74A to 74D of the casing base 71 of the microphone 7 for acoustic characteristic measurement, the corner portion 74A from which the cord 72 is pulled out is positionally aligned with the slit 18 for cord insertion.

Figure 3C:
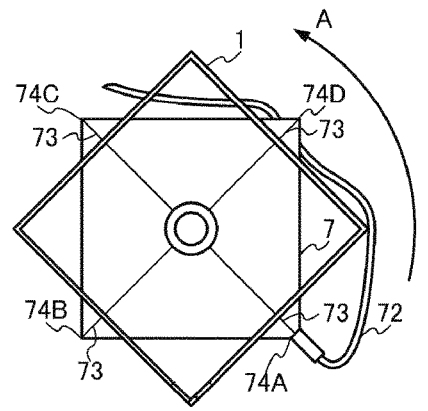
Figure 3B:
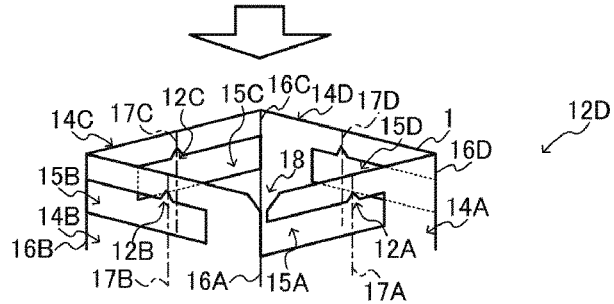
Figure 3D:
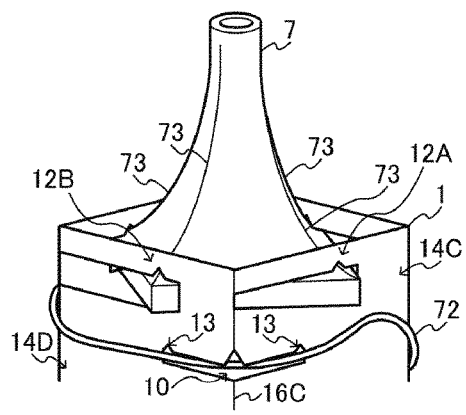

Then, as illustrated in FIG. 3(B), the microphone 7 for acoustic characteristic measurement is rotated about its axis center in a direction A in which the corner portions 74A to 74D of the casing base 71 of the microphone 7 for acoustic characteristic measurement enter the microphone-holding slits 15A to 15D from the end portions on one side (end portions at the ridge line positions) of the microphone-holding slits 15A to 15D, thereby bringing lateral surfaces of the casing base 71 of the microphone 7 for acoustic characteristic measurement into contact with cut edges in end portions on the other side of the microphone-holding slits 15A to 15D. The casing corner portions 74A to 74D of the microphone 7 for acoustic characteristic measurement are thus held in the microphone-holding slits 15A to 15D. In this step, as illustrated in FIG. 3(D), projecting portions of the casing (ridge line portions of the quadrangular pyramid-shaped casing) of the microphone 7 for acoustic characteristic measurement are engaged with the triangular notches 12A to 12D formed at the cut edges of the respective microphone-holding slits 15A to 15D to prevent the microphone 7 for acoustic characteristic measurement from shaking.

As illustrated in FIG. 3(C), the cord 72 of the microphone 7 for acoustic characteristic measurement is wound from the position of the microphone-holding slit 15A in the same direction as the direction A in which the microphone 7 for acoustic characteristic measurement is rotated, and is pushed into the slit 10 for microphone fixation of the uppermost stage connection part 1. As illustrated in FIG. 3(D), the cord 72 of the microphone 7 for acoustic characteristic measurement is thus fixed in a state in which the cord 72 is caught on both the end portions of the slit 10 for microphone fixation of the uppermost stage connection part 1. The cord 72 of the microphone 7 for acoustic characteristic measurement is wound in the direction A in which the lateral surfaces of the casing base 71 of the microphone 7 for acoustic characteristic measurement are pressed against the cut edges in the end portions on the other side of the microphone-holding slits 15A to 15D, respectively. Therefore, the microphone 7 for acoustic characteristic measurement is prevented from rotating in the opposite direction to drop off the microphone-holding slits 15A to 15D.

As illustrated in FIG. 4(A), the lower end portion of the uppermost stage connection part 1 is inserted in the axis center direction into the upper end portion of the intermediate connection part 2, and the slit 22 for connection of the intermediate connection part 2 is positionally aligned with the slit 19 for height adjustment, which is determined by the desired height of the microphone stand 100, and is exposed from the slit 19 for height adjustment. Then, the cord 72 of the microphone 7 for acoustic characteristic measurement, which is pulled out from the slit 10 for microphone fixation of the uppermost stage connection part 1, is pushed into the slit 19 for height adjustment of the uppermost stage connection part 1 inside the intermediate connection part 2 from outside the intermediate connection part 2 through the slit 22 for connection. As illustrated in FIG. 4(C), the cord 72 fixed to the slit 10 for microphone fixation of the uppermost stage connection part 1 thus passes through the slit 22 for connection from outside the intermediate connection part 2 to be fixed to the slit 19 for height adjustment of the uppermost stage connection part 1 inside the intermediate connection part 2, and hence the uppermost stage connection part 1 is prevented from sliding with respect to the intermediate connection part 2.

As illustrated in FIG. 4(B), the lower end portion of the intermediate connection part 2 is inserted in the axis center direction into the upper end portion of the lowermost stage connection part 3, and the slit 29 for connection of the intermediate connection part 2 is positionally aligned with the slit 32 for connection of the lowermost stage connection part 3, and is exposed from the slit 32 for connection. Then, the cord 72 of the microphone 7 for acoustic characteristic measurement, which is pulled out from the slit 22 for connection of the intermediate connection part 2, is pushed into the slit 29 for connection of the intermediate connection part 2 inside the lowermost stage connection part 3 from outside the lowermost stage connection part 3 through the slit 32 for connection. As illustrated in FIG. 4(C), the cord 72 fixed to the slit 22 for connection of the intermediate connection part 2 thus passes through the slit 32 for connection from outside the lowermost stage connection part 3 to be fixed to the slit 29 for connection of the intermediate connection part 2 inside the lowermost stage connection part 3, and hence the intermediate connection part 2 is prevented from sliding with respect to the lowermost stage connection part 3.

As illustrated in FIG. 1, the base portion 6 is arranged so that the leg portions 42 of the two intersecting base parts 4A and 4B are positioned substantially at equal angular intervals about the axis center, and the insertion portions 41 of the two base parts 4A and 4B are inserted into a lower end portion of the lowermost stage connection part 3. In this step, the insertion portions of the two base parts 4A and 4B are arranged inside the lowermost stage connection part 3 at diagonal positions of the lowermost stage connection part 3. Therefore, the two base parts 4A and 4B are fixed at an intersecting angle of approximately 90° to securely support the pillar portion 5, and the tube shape of each of the connection parts 1 to 3 is also maintained to allow the pillar portion 5 to keep its upright state.

The embodiment of the present invention has been described above.

The microphone stand 100 according to this embodiment includes the two connection parts 1 and 2, which are used so that one is inserted into the other, and can be locked at a desired height position. Therefore, the height of the microphone stand 100 can be easily adjusted by sliding of those two connection parts 1 and 2. The connection part 1 on one side has the plurality of slits 19 for height adjustment, which are formed at the corner portion thereof at predetermined intervals in the height direction of the microphone stand 100. The connection part 2 on the other side has the slit 22 for connection, which is formed so as to be positionally aligned with any one of the slits 19 for height adjustment. Therefore, the height of the microphone stand 100 can be fixed by pushing the cord 72 of the microphone 7 for acoustic characteristic measurement into any one of the slits 19 for height adjustment and the slit 22 for connection, which are positionally aligned with each other by the sliding operation of the two connection parts 1 and 2. The cord 72 of the microphone 7 for acoustic characteristic measurement can be thus used as a stopper without separately using a special stopper. Therefore, manufacturing costs of the microphone stand 100 can be reduced.

According to this embodiment, the microphone stand 100 whose height may reach substantially a position of ears of a user is formed by connecting the plurality of parts 1 to 3, 4A, and 4B to each other in the axis center direction. Therefore, as paper board for forming the respective parts 1 to 3, 4A, and 4B, for example, inexpensive paper board conforming to the standards (for example, A4 size) can be formed by processing with relatively small dies even in consideration of differences in height of individual users. Accordingly, manufacturing costs of the microphone stand 100 can be further reduced.

The cord 72 of the microphone 7 for acoustic characteristic measurement of the microphone stand 100 can be fixed to the microphone stand 100 at the plurality of positions by locking the connection parts 1 to 3 connected to each other. Therefore, the cord 72 suspended from the microphone 7 for acoustic characteristic measurement, which is held at the upper end portion of the microphone stand 100, can also be prevented from swinging. Thus, there is no need to separately perform an operation for accommodating the cord 72 of the microphone 7 for acoustic characteristic measurement, thereby being capable of simplifying the mounting operation of the microphone 7 for acoustic characteristic measurement.

The present invention is not limited to the above-mentioned embodiment, and may be modified variously within the scope of the gist thereof.

For example, according to this embodiment, the three connection parts 1 to 3 having different opening sizes from each other are arranged so that a connection part having a smaller opening size is located at a higher stage. Conversely, the three connection parts 1 to 3 having different opening sizes from each other may be arranged so that a connection part having a larger opening size is located at a higher stage. Further, only for the intermediate connection part 2, a connection part different in opening size from the other two connection parts 1 and 3 may be used so that the upper and lower end portions of the intermediate connection part 2 are inserted into the two connection parts 1 and 3, or the two connection parts 1 and 3 are inserted into the upper and lower end portions of the intermediate connection part 2. Moreover, the plurality of slits 19 for height adjustment may be formed in the connection parts 2 and 3 other than the uppermost stage connection part 1.

According to this embodiment, the corner portions of the two lateral surfaces 14A and 14B on both the sides of the slit 18 for cord insertion are obliquely cut out so that the cord 72 can be smoothly introduced into the slit 18 for cord insertion. However, a corner portion positioned at a connecting portion between the slit 18 for cord insertion and the microphone-holding slit 15A may be obliquely cut out so that the cord 72 can be smoothly moved away from the microphone-holding slit 15A.

According to this embodiment, the slits 19, 22, 29, and 32 formed in the connection parts 1 to 3 and the cord 72 of the microphone 7 for acoustic characteristic measurement, which is engaged with those slits 19, 22, 29, and 32, construct the lock mechanism configured to mutually lock the connection parts connected to each other. However, this structure is not necessarily essential. For example, an opening may be formed in any one corner portion of a connection part and any one corner portion of another connection part into which the connection part is to be inserted may be cut so that the corner portion of the outer connection part is pushed into the opening of the inner connection part at a cut position. A structural example of such a lock mechanism is illustrated in FIGS. 5.

Figure 5A:
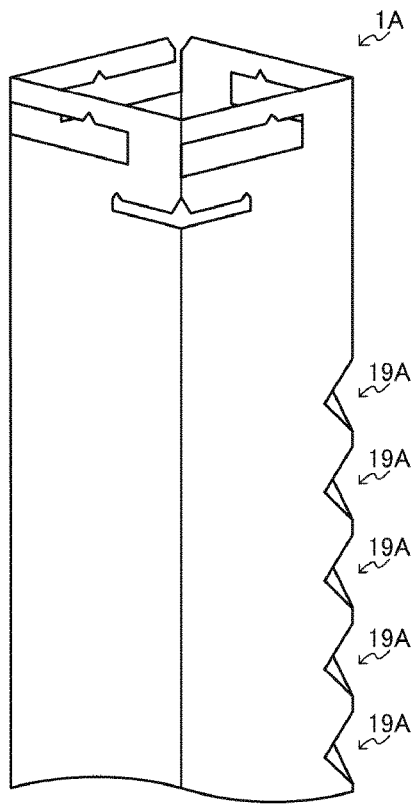
FIG. 5(A) to FIG. 5(C) are views for illustrating another structural example of a lock mechanism.

Among four corner portions corresponding to respective ridge lines of an uppermost stage connection part 1A, at least one corner portion has a plurality of cutouts 19A for height adjustment, which are formed at predetermined intervals in the axis center direction, as illustrated in FIG. 5(A). Cut edges of those cutouts 19A for height adjustment each have, for example, a rhombic shape in which the width decreases toward upper and lower directions. The rhombic shape is taken herein as an exemplary shape of the cut edges of the cutouts 19A for height adjustment. However, the cut edge shape of the cutouts 19A for height adjustment is not limited to the rhombic shape, but may be any shape as long as an edge portion of a slit 22A described later, which is folded inside an intermediate connection part 2A, can be held.

Figure 5B:
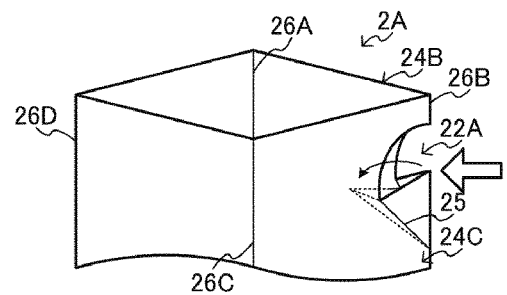

As illustrated in FIG. 5(B), an upper end portion of the intermediate connection part 2A into which the uppermost stage connection part 1A is to be inserted has the slit (cutout) 22A, which vertically separates anyone corner portion among four corner portions corresponding to respective ridge lines 26A to 26D. The slit 22A is formed at a position through which the plurality of cutouts 19A for height adjustment (cutouts) of the uppermost stage connection part 1A pass in the axis center direction by a sliding operation of the intermediate connection part 2A and the uppermost stage connection part 1A, and is positionally aligned with any one cutout 19A for height adjustment, which is determined by a desired height of the microphone stand 100. Further, lateral surfaces 24B and 24C on both sides of the ridge line 26B, which are cut by the slit 22A, have mountain fold lines 25 extending from both ends of the slit 22A toward a position on the ridge line 26B on a lower side of the slit 22A.

Figure 5C:
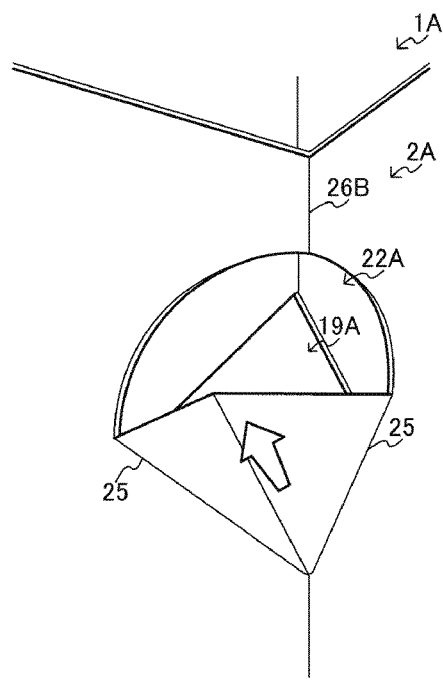

As illustrated in FIG. 5(C), when the corner portion of the intermediate connection part 2A, which is cut by the slit 22A, is pushed into the cutout 19A for height adjustment of the uppermost stage connection part 1A at a position on a lower side of the slit 22A in a state in which the slit 22A of the intermediate connection part 2A is positionally aligned with any one cutout 19A for height adjustment of the uppermost stage connection part 1A, the lateral surfaces 24B and 24C of the intermediate connection part 2A are folded at the two mountain fold lines 25. The edge portion of the slit 22A is thus projected inside the intermediate connection part 2A so that the corner portion of the intermediate connection part 2A is inserted into the cutout 19A for height adjustment of the uppermost stage connection part 1A. A back side of the two mountain fold lines folded into a V shape is thus engaged with a V-shaped valley portion at the cut edge of the cutout 19A for height adjustment of the uppermost stage connection part 1A, and hence the uppermost stage connection part 1A and the intermediate connection part 2A are locked. In this case, the uppermost stage connection part 1A has the plurality of cutouts 19A for height adjustment, which are formed in the height direction, and the intermediate connection part 2A has the single slit 22A, which is formed at the upper end portion. Instead of this structure, the plurality of slits 22A may be formed in the intermediate connection part 2A in the height direction, and the single cutout 19A for height adjustment may be formed at a lower end portion of the uppermost stage connection part 1A so that the edge portion of any one of the slits 22A of the intermediate connection part 2A may be folded into the cutout 19A for height adjustment of the uppermost stage connection part 1A.

In the above-mentioned embodiment, quadrangular tube-shaped connection parts 1 to 3 (having a substantially square opening) in which distances between the two pairs of opposed lateral surfaces are substantially equal to each other are used. However, the present invention is not limited thereto. The connection parts 1 to 3 may each have any other tube shape (for example, having a substantially rectangular opening) that can be folded down and can be nested from two opposite directions along their axis centers. Alternatively, the connection parts 1 to 3 may each have any other tube shape (for example, a tubular shape) that cannot be folded down. In this case, each of the slits 19, 22, 29, and 32 only needs to have such a shape that a middle portion is projected outward from a straight line connecting both ends.

In the above-mentioned embodiment, the parts 1 to 3, 4A, and 4B of the microphone stand set are formed of paper board, but the present invention is not limited thereto. For example, a flexible resin film or other materials may be used.

REFERENCE SIGNS LIST

100: microphone stand, 1, 1A, 2, 2A, 3: connection part, 4A, 4B: base part, 5: pillar portion, 6: base portion, 7: microphone for acoustic characteristic measurement, 10: slit for microphone fixation, 12A-12D: notch, 13: notch, 14A-14D: lateral surface, 15A-15D: microphone-holding slit, 16A-16D: ridge line of connection part, 17A-17D: center line of lateral surface of connection part, 18: slit for cord insertion, 19: slit for height adjustment, 22, 29, 32: slit for connection, 24A-24D: lateral surface of connection part, 25: mountain fold line, 26A-26D: ridge line of connection part, 41: insertion portion of base part, 42: leg portion of base part, 71: casing base of microphone for acoustic characteristic measurement, 72: cord of microphone for acoustic characteristic measurement, 73: ridge line of casing of microphone for acoustic characteristic measurement, 74A-74D: corner portion of casing base of microphone for acoustic characteristic measurement

The invention claimed is:

1. A microphone stand configured to hold a microphone, the microphone stand comprising a first tubular part and a second tubular part, which are connected together in a height direction of the microphone stand by slidable insertion of one of the first tubular part and the second tubular part into another one of the first tubular part and the second tubular part in an axis center direction of the microphone stand, the first tubular part having a plurality of first cutouts, in each of which a middle portion of each of the plurality of first cutouts projects outward from a straight line connecting both ends of the each of the plurality of first cutouts, the plurality of first cutouts being formed in line in the height direction of the microphone stand, the second tubular part having a second cutout formed at a position through which the plurality of first cutouts pass by relative sliding of the first tubular part and the second tubular part in the height direction of the microphone stand, the second cutout being positionally aligned with any one of the plurality of first cutouts, a cord of the microphone being arranged inside the any one of the plurality of first cutouts and the second cutout, which are positionally aligned with each other by the relative sliding of the first tubular part and the second tubular part in the height direction of the microphone stand, to thereby serve as a stopper configured to prevent the relative sliding of the first tubular part and the second tubular part in the height direction of the microphone stand.

2. A microphone stand configured to hold a microphone, the microphone stand comprising a first tubular part and a second tubular part, which are connected together in a height direction of the microphone stand by slidable insertion of one of the first tubular part and the second tubular part into another one of the first tubular part and the second tubular part in an axis center direction of the microphone stand, the first tubular part having a plurality of first cutouts, in each of which a middle portion of each of the plurality of first cutouts projects outward from a straight line connecting both ends of the each of the plurality of first cutouts, the plurality of first cutouts being formed in line in the height direction of the microphone stand, the second tubular part having a second cutout formed at a position through which the plurality of first cutouts pass by relative sliding of the first tubular part and the second tubular part in the height direction of the microphone stand, the second cutout being positionally aligned with any one of the plurality of first cutouts, a cord of the microphone being arranged inside the any one of the plurality of first cutouts and the second cutout, which are positionally aligned with each other by the relative sliding of the first tubular part and the second tubular part in the height direction of the microphone stand, to thereby serve as a stopper configured to prevent the relative sliding of the first tubular part and the second tubular part in the height direction of the microphone stand, further comprising grasping portions, which are formed at both end portions of the each of the plurality of first cutouts, and are configured to grasp the cord of the microphone.

3. A microphone stand configured to hold a microphone, the microphone stand comprising a first tubular part and a second tubular part, which are connected together in a height direction of the microphone stand by slidable insertion of one of the first tubular part and the second tubular part into another one of the first tubular part and the second tubular part in an axis center direction of the microphone stand, the first tubular part having a plurality of first cutouts, in each of which a middle portion of each of the plurality of first cutouts projects outward from a straight line connecting both ends of the each of the plurality of first cutouts, the plurality of first cutouts being formed in line in the height direction of the microphone stand, the second tubular part having a second cutout formed at a position through which the plurality of first cutouts pass by relative sliding of the first tubular part and the second tubular part in the height direction of the microphone stand, the second cutout being positionally aligned with any one of the plurality of first cutouts, a cord of the microphone being arranged inside the any one of the plurality of first cutouts and the second cutout, which are positionally aligned with each other by the relative sliding of the first tubular part and the second tubular part in the height direction of the microphone stand, to thereby serve as a stopper configured to prevent the relative sliding of the first tubular part and the second tubular part in the height direction of the microphone stand, further comprising a guide portion, which is formed in the middle portion of each of the plurality of first cutouts and the second cutout, and is configured to guide the cord of the microphone into the any one of the plurality of first cutouts and the second cutout, which are positionally aligned with each other.

4. A microphone stand configured to hold a microphone, the microphone stand comprising a first tubular part and a second tubular part, which are connected together in a height direction of the microphone stand by slidable insertion of one of the first tubular part and the second tubular part into another one of the first tubular part and the second tubular part in an axis center direction of the microphone stand, the first tubular part having a plurality of first cutouts formed in line in the height direction of the microphone stand, the second tubular part having a second cutout formed at a position through which the plurality of first cutouts pass by relative sliding of the first tubular part and the second tubular part in the height direction of the microphone stand, the second cutout being positionally aligned with any one of the plurality of first cutouts, an edge portion of the second cutout, which is positionally aligned with each other by the relative sliding of the first tubular part and the second tubular part in the height direction of the microphone stand, wherein each of the plurality of first cutouts having cut edges shaped for engaging with the edge portion of the second cutout, wherein the edge portion of the second cutout having mountain fold lines extending from both ends of the second cutout toward a position on the second tubular part below the second cutout, wherein when the edge portion of the second cutout is positionally aligned with any one of the plurality of first cutouts and folded at the two mountain fold lines forming a V shape projected inside the second tubular part, the V shape projected inside the second tubular part engages with the positionally aligned any one of the plurality of first cutouts, to thereby prevent the relative sliding of the first tubular part and the second tubular part in the height direction of the microphone stand.

5. A microphone stand configured to hold a microphone, the microphone stand comprising a first tubular part and a second tubular part, which are connected together in a height direction of the microphone stand by slidable insertion of one of the first tubular part and the second tubular part into another one of the first tubular part and the second tubular part in an axis center direction of the microphone stand, the first tubular part having a plurality of first cutouts formed in line in the height direction of the microphone stand, the second tubular part having a second cutout formed at a position through which the plurality of first cutouts pass by relative sliding of the first tubular part and the second tubular part in the height direction of the microphone stand, the second cutout being positionally aligned with any one of the plurality of first cutouts, an edge portion of the second cutout, which is positionally aligned with each other by the relative sliding of the first tubular part and the second tubular part in the height direction of the microphone stand, wherein each of the plurality of first cutouts having cut edges shaped for engaging with the edge portion of the second cutout, wherein the edge portion of the second cutout having mountain fold lines extending from both ends of the second cutout toward a position on the second tubular part below the second cutout, wherein when the edge portion of the second cutout is positionally aligned with any one of the plurality of first cutouts and folded at the two mountain fold lines forming a V shape projected inside the second tubular part, the V shape projected inside the second tubular part engages with the positionally aligned any one of the plurality of first cutouts, to thereby prevent the relative sliding of the first tubular part and the second tubular part in the height direction of the microphone stand, wherein the first tubular part, which is located on an upper side of the microphone stand in an upright state, has third cutouts formed in lateral surfaces thereof to insert casing corner portions of a microphone for acoustic characteristic measurement, wherein the microphone comprises a quandrangular pyramid shape casing, and wherein the microphone is arranged inside the first tubular part, which has the third cutouts formed therein, so that the casing corner portions of the quandrangular pyramid shape casing project outward from the third cutouts and engage with the third cutouts.

6. A microphone stand set configured to form the microphone stand of claim 1, the microphone stand set comprising the first tubular part and the second tubular part.

7. A microphone stand set configured to form the microphone stand of claim 2, the microphone stand set comprising the first tubular part and the second tubular part.

8. A microphone stand set configured to form the microphone stand of claim 3, the microphone stand set comprising the first tubular part and the second tubular part.

9. A microphone stand set configured to form the microphone stand of claim 4, the microphone stand set comprising the first tubular part and the second tubular part.

10. A microphone stand set configured to form the microphone stand of claim 5, the microphone stand set comprising the first tubular part and the second tubular part.

* * * * *